(12) United States Patent
Alkier

(10) Patent No.: US 11,739,630 B2
(45) Date of Patent: *Aug. 29, 2023

(54) SENSOR SUB CONFIGURATION

(71) Applicant: McCoy Global Inc., Edmonton (CA)

(72) Inventor: Michael Albert Alkier, Liberty Hill, TX (US)

(73) Assignee: MCCOY GLOBAL INC., Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,753

(22) Filed: Aug. 15, 2022

(65) Prior Publication Data

US 2022/0403701 A1 Dec. 22, 2022

Related U.S. Application Data

(63) Continuation of application No. 16/415,249, filed on May 17, 2019, now abandoned.

(Continued)

(51) Int. Cl.
*E21B 47/01* (2012.01)
*E21B 47/017* (2012.01)
(Continued)

(52) U.S. Cl.
CPC .............. *E21B 47/01* (2013.01); *E21B 3/022* (2020.05); *E21B 47/017* (2020.05); *E21B 47/13* (2020.05);
(Continued)

(58) Field of Classification Search
None
See application file for complete search history.

(56) References Cited

U.S. PATENT DOCUMENTS 5,495,237 A 2/1996 Yuasa et al.
5,904,414 A 5/1999 Monteleone et al.
(Continued)

OTHER PUBLICATIONS

Nabors, Achieve Quality Monitoring, Control, and Evaluation of Tubular Connections With Nabors' Testork TM Sub and Software, Rigtelligence SM for the Future, www.nabors.com.
(Continued)

*Primary Examiner* — Curtis A Kuntz
*Assistant Examiner* — Jerold B Murphy
(74) *Attorney, Agent, or Firm* — Field LLP

(57) ABSTRACT

A system for measuring drilling and completion operational parameters in a tubular handling system is provided. The system includes a sensor sub connected below a top drive of the tubular handling system; one or more sensors within the sensor sub, for measuring, in the form of electrical signals, operational parameters; one or more low-power integrated circuits within the sensor sub, for receiving electrical signals from the sensors and digitizing the signals; two or more radio frequency (RF) transmitters located in the sensor sub, for transmitting the digitized signals; one or more commercially available lithium batteries within the sensor sub and remote receiver hub located remote from the tubular handling system and including a remote antenna for receiving the digitized signals from the two or more RF transmitters; one or more processing units for processing received digitized signals into engineering units for each of the operational parameters; and an input/output data connection for communicating operational parameters to an operator.

6 Claims, 6 Drawing Sheets

FIGURE 3B

Related U.S. Application Data

(60) Provisional application No. 62/713,859, filed on Aug. 2, 2018, provisional application No. 62/673,236, filed on May 18, 2018.

(51) Int. Cl.
| | |
|---|---|
| *E21B 3/02* | (2006.01) |
| *E21B 47/13* | (2012.01) |
| *H01M 50/24* | (2021.01) |
| *H01M 50/289* | (2021.01) |
| *H01M 50/202* | (2021.01) |
| *H01M 50/242* | (2021.01) |
| *H01M 50/572* | (2021.01) |
| *H01M 50/383* | (2021.01) |
| *H01M 50/271* | (2021.01) |

(52) U.S. Cl.
CPC ......... *H01M 50/202* (2021.01); *H01M 50/24* (2021.01); *H01M 50/242* (2021.01); *H01M 50/271* (2021.01); *H01M 50/289* (2021.01); *H01M 50/383* (2021.01); *H01M 50/572* (2021.01); *H01M 2200/00* (2013.01); *H01M 2220/10* (2013.01)

(56) References Cited

U.S. PATENT DOCUMENTS

| | | | |
|---|---|---|---|
| 7,163,065 | B2 | 1/2007 | Zhang et al. |
| 11,530,604 | B2* | 12/2022 | Alkier .................. H01M 4/139 |
| 2006/0142945 | A1* | 6/2006 | McLaughlin ............ G01V 1/40 |
| | | | 702/9 |
| 2015/0176390 | A1* | 6/2015 | Greening .............. E21B 47/007 |
| | | | 73/152.49 |
| 2015/0285055 | A1* | 10/2015 | Anderson ............ E21B 19/166 |
| | | | 175/40 |
| 2016/0115753 | A1* | 4/2016 | Frazier ................ E21B 43/1185 |
| | | | 166/66.4 |
| 2018/0187539 | A1* | 7/2018 | Hadi ........................ E21B 3/02 |

OTHER PUBLICATIONS

Aelium Solutions LLC, WITS A Smart Solution, Wireless Information Technology System TM, www.aeliumsolutions.com.

* cited by examiner

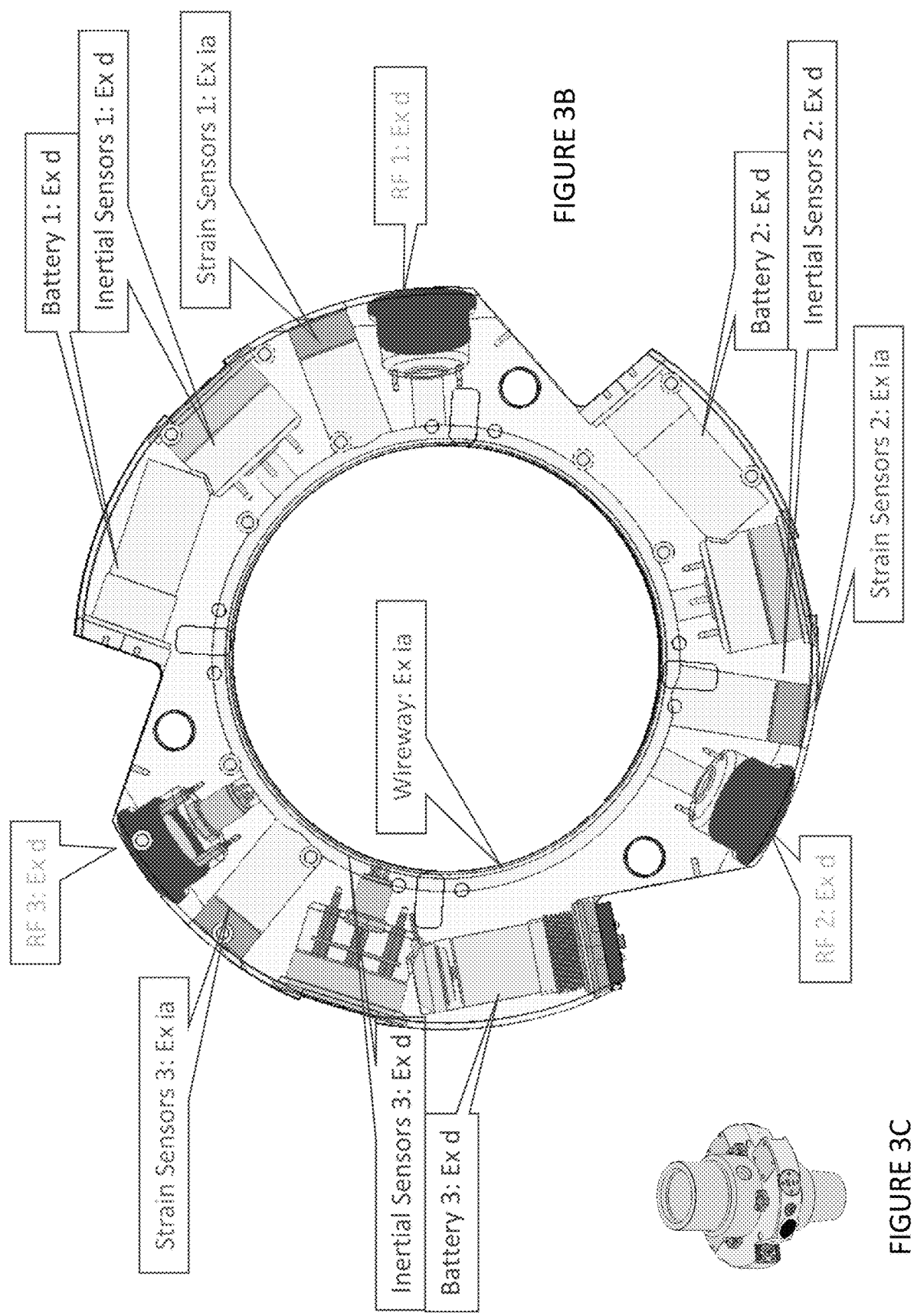

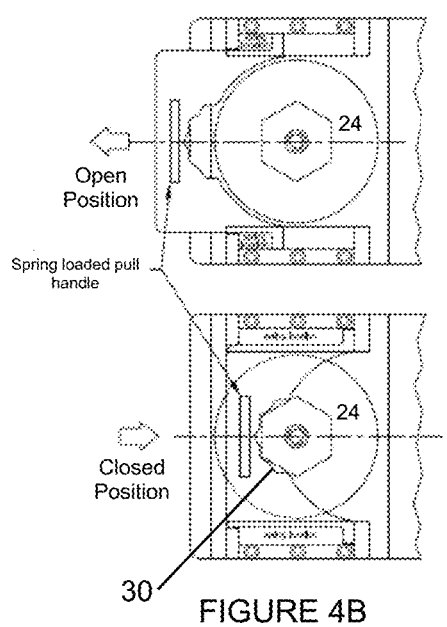
FIGURE 4A
FIGURE 4B
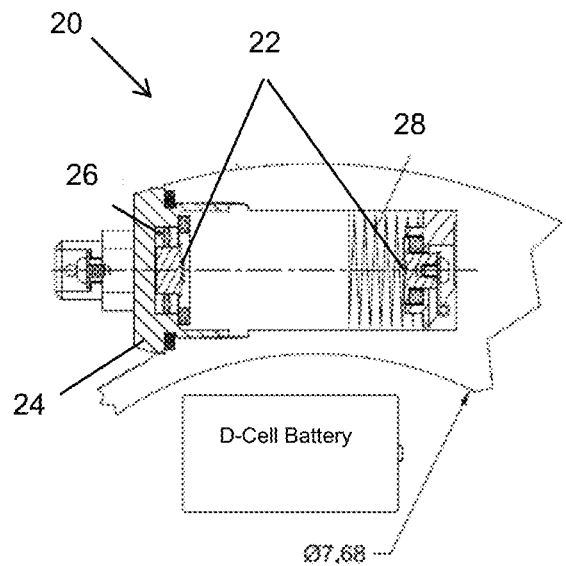
FIGURE 4C

SENSOR SUB CONFIGURATION

CROSS-REFERENCE TO RELATED APPLICATIONS

This is a continuation of U.S. patent application Ser. No. 16/415,249 filed May 17, 2019. U.S. patent application Ser. No. 16/415,249 claims priority from U.S. provisional patent application No. 62/713,859 filed Aug. 2, 2018 and U.S. provisional patent application No. 62/673,236 filed May 18, 2018. Entireties of all the applications referred to in this paragraph are incorporated herein by reference.

FIELD

The present disclosure relates to improvements in a sensor sub used in conjunction with oil and gas well drilling and completion operations.

BACKGROUND

Oil and gas wells are first drilled using sections of drill pipe progressively threaded together forming a drill string with a drilling bit always at the bottom. During drilling, the top drive provides rotational torque to the drilling bit by way of the drill string. After the initial well is drilled, the drill string is removed and tubing or casing strings, are similarly threaded together and lowered down the wellbore for the purposes of performing operations or producing oil or gas from the well.

During the drilling phase, there is required a means to monitor the forces being applied to the drill string and the drilling bit to ensure that the well is being drilled as efficiently as possible. Primary forces to be monitored include torque applied by the top drive, rotational speed, fluid pressure, and downward weight on the drilling bit. Secondary forces are generated by the interaction of the pipe string and drilling bit with the surrounding formations that can be measured using acceleration sensors. The primary and secondary data can be electronically recorded for future analysis as well as presented graphically to the drilling crew for real-time adjustments.

There is also required a means for determining satisfactory shouldering, engagement and sealing of the connections used to join sections of tubing and casing used during the well completion process. A satisfactory connection can be determined by measuring the amount of torque applied as well as counting the number of rotations (referred to as turns) required to thread the joint together. The torque and turns measured for each connection is recorded and saved for future reference.

In the past, the number of rotations required to secure a drill pipe or casing connection has been measured using a device that must be physically engaged to each new connection. The new method is to determine the number of rotations using inertial measurements. By placing the inertial measurement device on the same tool the measures torque and axial loads, a single sensor sub can be used.

Traditionally, torque subs can be used for both the drilling and completion phases of a well to measure the primary forces during drilling and then also the individual connections during installation of tubing and casing in the completion phase. Torque subs are installed below the top drive and as a result, must fit in a very limited space that is also occupied by the manual and remote well control valves as well as the pipe handler.

The most commonly faced problem with previous sensor sub deployments is fitting the sub onto an existing top-drive. The most widely used top drive in the industry has a fixed distance from the drive shaft (referred to as the quill) to the pipe handler. The only way to previously fit a sensor sub in this distance is to increase the length of the torque arrestor that holds the pipe handler as can be seen in FIG. 1. This increased length of the torque arrestor provides the additional space required to install the sensor sub. Increasing the torque arrestor length is costly, and further makes the arrestor difficult to install, as well as the fact that such extended torque arresters are not available for all top drive models.

US 2018/0187539 to Hadi teaches an instrumented saver sub with a smart material adjustable whenever a stand is added to the drill string to have different spring characteristics to match the impedance of the top drive to the impedance of the drill string. The saver sub of Hadi is meant to mechanically manipulate and dampen stick-slip during drilling. It cannot be used to sense or convey drilling and completion parameters needed to ensure proper drilling and completion operation. Such measurement in an arrangement like Hadi would still require traditional torque subs.

Power consumption by typical sensor subs in data collection and processing is also traditionally very high, requiring either custom, high power batteries or frequent battery changing, which leads to frequent stoppage in make up operations.

A need therefore exists for providing a sensor sub that is dimensioned such that it can be located within the existing configuration of the top drive such that further lengthening of the torque arrester is not required.

An additional element of the top-drive arrangement is the saver sub as seen in FIG. 1. The saver sub is a short section of drill pipe that is used to protect the threads on the manual valve from the wear and tear of the multiple repeated connections required during the drilling phase.

SUMMARY

A system for measuring drilling and completion operational parameters in a tubular handling system is provided. The system includes:
a) a sensor sub connected below a top drive of the tubular handling system within a saver sub section of the tubular handling system;
b) one or more sensors located within the sensor sub, for measuring, in the form of electrical signals, operational parameters selected from the group consisting of pressure, torque, tension, acceleration in all three axis (X, Y, Z), rotations per minute (rpm) rotational turns, and temperature;
c) one or more low-power integrated circuits located within the sensor sub, for receiving electrical signals from the sensors and digitizing the signals;
d) two or more radio frequency (RF) transmitters located in the sensor sub, for transmitting the digitized signals;
e) one or more commercially available lithium batteries within the sensor sub for powering the one or more sensors and the one or more integrated circuits; and
f) a remote receiver hub located remote from the tubular handling system and powerable from an AC power source, the remote receiver hub including:
   i) a remote antenna for receiving the digitized signals from the two or more RF transmitters;

ii) one or more processing units for processing received digitized signals into engineering units for each of the operational parameters; and iii) an input/output data connection for communicating operational parameters to an operator.

A method of replacing a battery in the sensor sub above, in a hazardous environment, is also provided. The method includes the steps of:

a) providing a battery holder as part of the sensor sub, said battery holder including battery housing having an electrical contact area, a removable end cap, and spring formed in the battery housing;

b) placing a battery in the housing, wherein the spring is extended to prevent contact of the battery with the electrical contact area in the battery housing;

c) engaging the end cap to the housing at least a minimum distance to seal off a flame path and isolate the battery from the hazardous environment; and d) engaging the end cap to the housing fully to cause compression of the spring to allow electrical connection of the battery to the electrical contact area only after the flame path is sealed off.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. In the drawings:

FIG. 3b is a cross sectional plan view of one example of a sensor sub of the present invention;

FIG. 3c is a perspective view of FIG. 4b;

FIGS. 4a and 4b are end views of a battery holder of the sensor sub of the present invention in an open and a closed position respectively;

FIG. 4c is a cross sectional elevation view of the battery holder of FIGS. 5a and 5b and FIG. 5 is a schematic diagram of one example of a receiver hub of the present invention.

Figure 1:
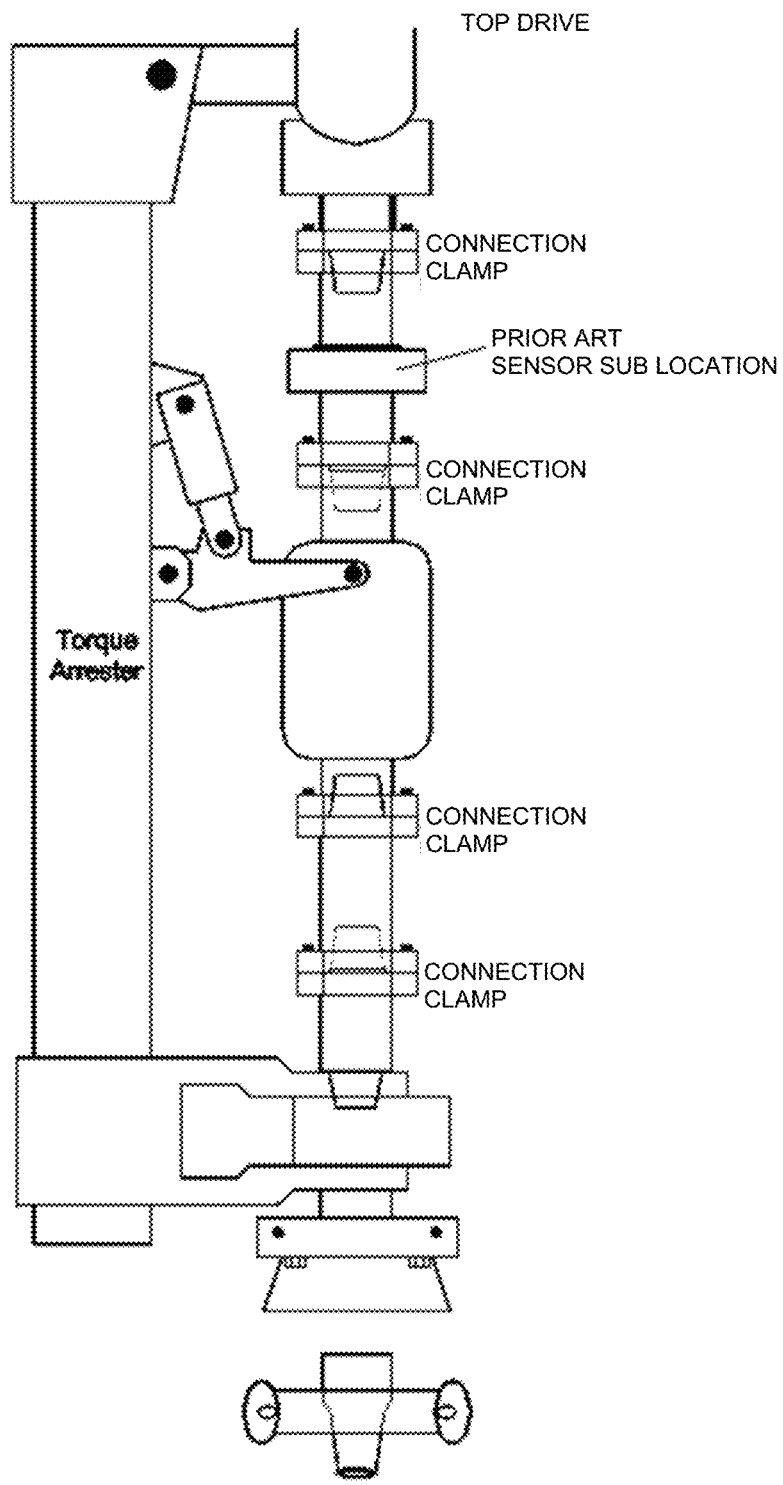
FIG. 1 is an elevation view of a typical top drive for a drilling or pipe handling system.

The drawing is not necessarily to scale and in some instances proportions may have been exaggerated in order more clearly to depict certain features.

DETAILED DESCRIPTION OF VARIOUS EMBODIMENTS

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

Figure 2:
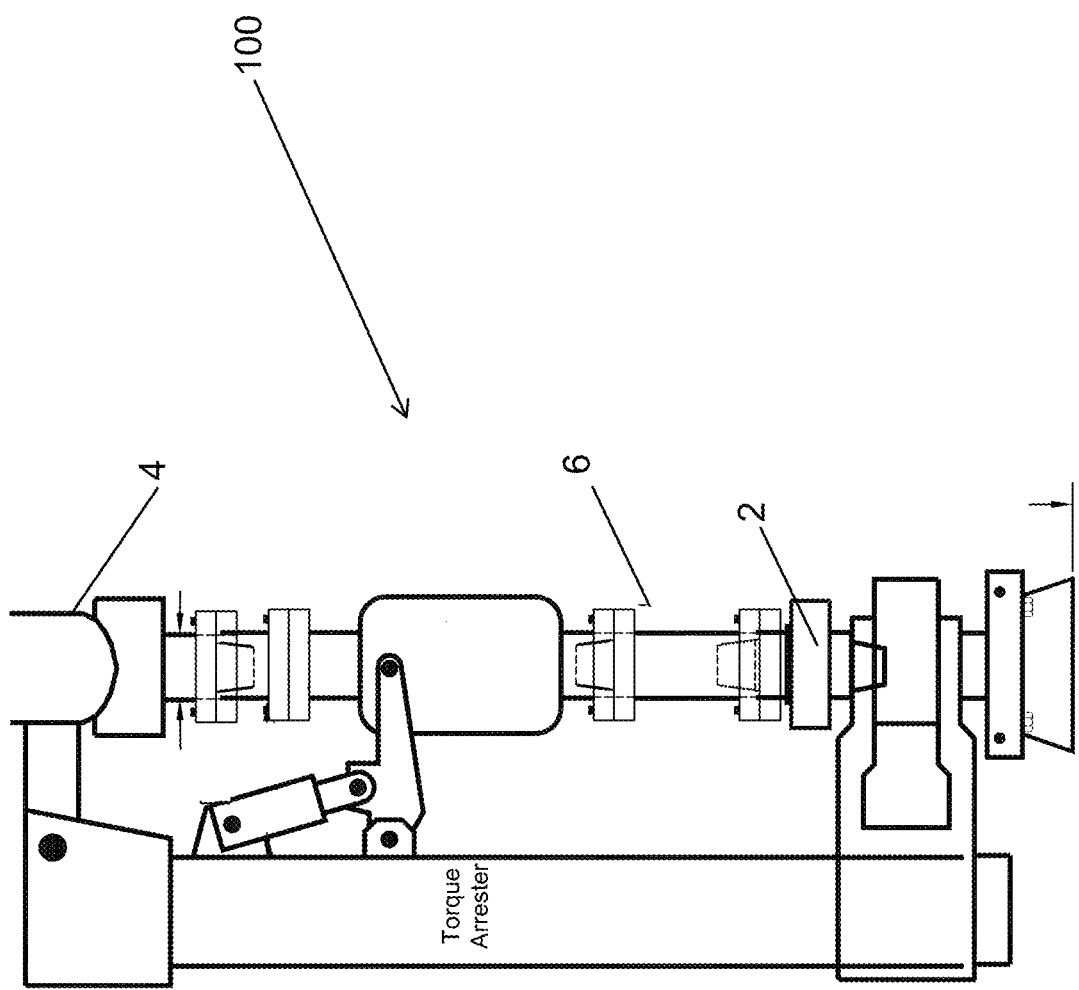
FIG. 2 is an elevation view of a top drive for a drilling or pipe handling system showing one example of the sensor sub of the present invention.

In a first embodiment, the sensor sub 2 is located on a pipe handling system 100, as seen in FIG. 2. In this embodiment, the sensor sub 2 is located at below the top-drive 4, and within the saver sub section 6. The sensor sub 2 is dimensioned so that it can be a replacement for the saver sub 6 as shown in FIG. 2.

The sensors within the sensor sub 2 measure the rotation, torque, fluid pressure, and hook load exerted by the top drive 4 to the drill string or the tubular connection to be made up.

The present sensor sub 2 has been designed to fit without the need for extending the torque arrestor. The present sensor sub 2 design is able to fit it the section typically reserved for the saver sub.

The present disclosure also provides for an improved sensor sub 2 having a modified electrical sensor design. The present electronic sensor sub sensors are used to measure parameters associated with drilling and completion operations including pressure, torque, tension, acceleration in all three axis (X, Y, Z), rotations per minute (rpm) rotational turns, and temperature.

The sensor sub sensors do not serve to manipulate drilling or completion operations or any connections in the drilling assembly. Instead, the sensor sub sensors provide electronic signals relating to the above parameters, said signals which can be processed into engineering measurements to inform the operator about the drilling or completion operation to determine acceptable operation. The sensor sub 2 transmits the digitized sensor signals to a remote receiver where the digitized signals are processed into measurements in standard engineering units that are then communicated by the receiver in real-time for viewing by the operators In the present invention, data processing functions have been removed from the sensor sub 2 and are instead conducted by a remote receiver 32 at a receiver hub as seen for example in FIG. 6, which has increased processing capabilities over the sensors. The receiver hub would be located in a central control space and comprises one or more processing units where digitized signals from the sensors of the sensor sub 2 are received, and processed and communicated to the operator as operational parameters. The sensed and processed parameters may trigger warnings and optionally also operational guidelines to the operator.

Sensor signals and other time-varying electrical signals are most efficiently transmitted by first digitizing or sampling them. Digitization can be accomplished using commercially available low-power integrated circuits. The ouptput of these circuits can be directly transmitted using any number of methods, including radio frequency (RF) methods. The additional processing necessary to convert these digitized signals into useful data is computationally intensive and requires a large power consuming computer.

In this way the sensor sub 2 would only digitize the analog signals from the sensors of the sensor sub and transmit those digitized signals with no further processing. Commercially available low-power integrated circuits are incorporated into the sensor sub 2 for these purposes. In addition, very low power inertial sensors with built-in digitizers are also incorporated into the sensor sub 2 so that the digitized output can be fed directly to a transmitter on the sensor sub 2. Small microprocessors are used soley to direct the flow of digitized data from the sensors to the RF transmitters.

Most preferably digitized but otherwise unprocessed data is transmitted to the receiver 32 using a radio frequency (RF) transmitter, although other means of transmission including near-field communication, Bluetooth, wireless internet, could be used. Preferably, more than one RF transmitter is used and can be auto-switched to enhance connectivity to the remote receiver hub. In a further preferred embodiment, the sensor sub 2 includes three RF transmitters RF 1, RF 2 and RF 3 that all transmit the digitized data to the receiver hub in three different directions. The three RF transmitter directions, together with the rotation of the sensor sub 2, creates spatial diversity and redundancy to ensure all digitized signals from the sensor sub 2 are received at the receiver hub to be processed.

The present sensor sub 2 has the ability to simultaneously sense via the sensor sub sensors, pressure, torque, tension, 3-axis acceleration, rpm, rotational turns, and temperature in real-time. This is accomplished by providing a separate digitized output for each sensor on separate channels. Optionally, one or more spare channels can be made available in the sensors for adding future sensors for measuring other parameters.

Figure 3A:
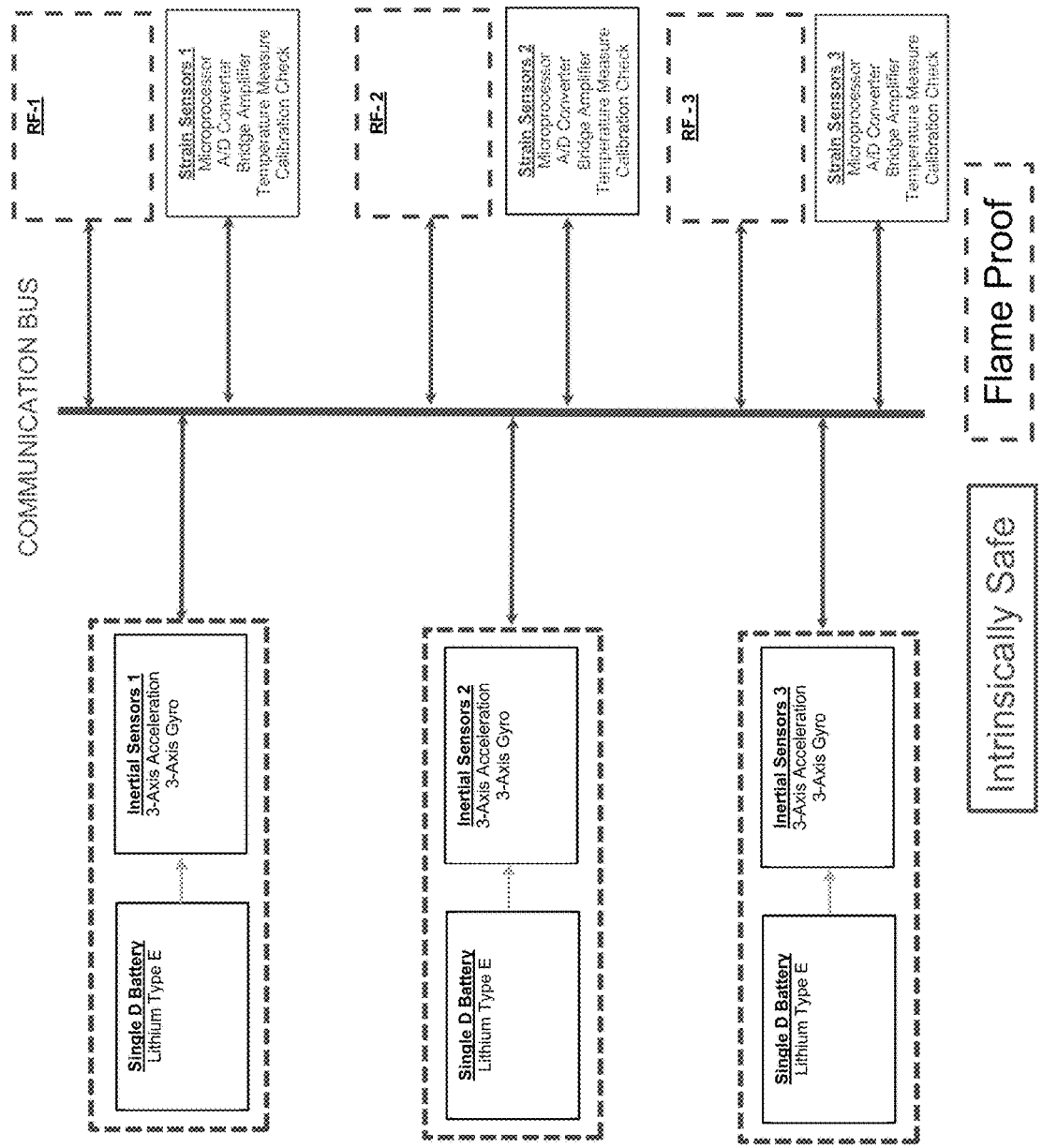
FIG. 3a is a schematic diagram of communications between a sensor of one embodiment of a sensor sub of the present invention and a receiver for receiving sensor data.

With reference to FIGS. 3a, 3b and 3c, a combination of protection methods and protection zoning are preferably incorporated directly into the sensor sub to meet flame and electrical requirements at the well drilling and completion site. The sensor sub 2 uses two methods of protection. Flameproofing (identified as Ex d in the Figures) is provided for high power devices within the sensor sub 2 that exceed energy storage limitations. For example, higher power elements of the sensor sub 2 such as the battery and the inertial sensors for measuring acceleration and rotations in all three axes (labeled "Inertial Sensor 1", "Inertial Sensor 2" and "Inertial Sensor 3" in FIG. 3a), are all preferably contained in a flame proof (Ex d) protection. Lower power components such a bridge or strain sensors, labelled as Strain Sensor-1, Strain Sensor-2 and Strain Sensor-3 in FIG. 3A, can be contained in an intrinsically safe (Ex ia) protection. The bridge sensors convert very small levels of mechanical stress and strain in the load-bearing elements of the drill string, to useful electrical signals that can be digitized and transmitted using RF methods. The dual protection methods of flame proofing and intrinsic safety, together with wireways to provide increased safety in wiring, all provide a cost-effective way to comply with hazardous area standards worldwide.

One benefit of simply and only digitizing the raw data from the sensors, with no further processing, is that allows the use of a smaller, and often lower cost, battery to power the sensor sub 2 than used previously. The present sensor sub 2 hence does not require a complicated and custom battery pack. Instead, the present sensor sub 2 uses a commercially available primary battery that can be locally sourced. This in turn alleviate issues associated with producing and shipping custom lithium battery packs. Lithium battery packs are heavily regulated by local and international agencies for transport and shipping, especially by air, due to the volatile nature of lithium.

The present invention provides a new electronic circuit design to allow the present sensor sub 2 to operate for as long as 30 days on a single commercially available lithium battery, preferably 'D' size. Optionally the present sensor sub 2 can be powered by one, two, three or more battery cells. The sensor sub 2 can more preferably operate for 30 days on 1 battery, for 60 days on 2 batteries, or for up to 90 days on 3 batteries. Hazardous area standards refer to this kind of lithium battery as Type E. To utilize a user installable commercial battery, battery holder is provided that can maintain electrical contact despite shock loads, vibrations, and varying temperature ranges experienced in the pipe handling equipment. Commonly, such equipment can experience up to 300 g shock loads, up to 30 g random vibrations, and temperature ranges from −40 C up to 85 C.

The current battery holder design is illustrated in FIGS. 4a, 4b and 4c. While this battery holder is described below in connection with the sensor sub of the present invention, it should be noted that this battery holder can be used in connection with any equipment, for housing batteries in a hazardous environment, wherein batteries are replaceable within the battery holder while the battery holder remains in the hazardous environment.

The present battery holder 20 includes a serrated contact area 22 to grip the battery's electrical terminal. The purpose of the serration is to prevent loss of electrical contact due to shock and vibration. The serrated contact 22 is formed on a removable end cap 24 and will preferably have a bearing 26 to allow the end cap 24 to be threaded into the housing without rotating the serrated contact against the battery terminal.

A spring 28 is further preferably provided to urge the battery partially out of the battery holder housing when the end cap 24 is opened, so that the battery can be easily removed. An additional function of the spring 28 is to prevent electrical connection of the battery until a predetermined number of threads, and preferably at least five threads, of the end cap have been engaged. This function may serve to satisfy requirements for "hot swap", or changing out of batteries in the presence of an explosive atmosphere since the electrical contact is not made until the end cap 24 is nearly secured, to thereby isolate the electrical connection of the battery from the atmosphere. As seen in FIGS. 4A and 4B, a locking mechanism 30 preferably engages the end cap 24 to prevent it from loosening during drilling.

Figure 5:
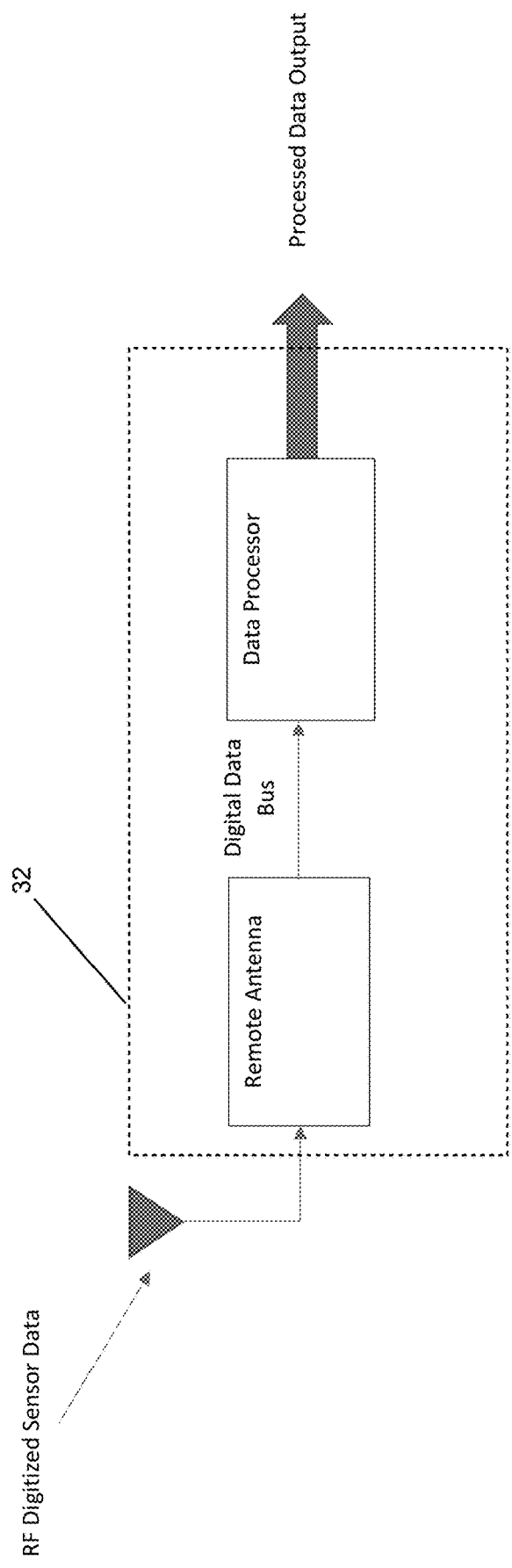

With reference to FIG. 5, the receiver 32 in the receiver hub is used to receive the digitized raw data measurements obtained from the RF transmitters of the sensor sub 2 sensors and to process that digitized data to provide values in useful engineering units to operators and external systems. At the receiver 32, the digitized signals are corrected for temperature, gain, drift, and undesired cross-talk interactions with other measurements. These corrections are computationally intensive and require a large power consuming computer. Sensor battery life can be greatly extended by moving the bulk of the data processing out of the sensor sub 2 and into the receiver 32. The receiver 32 operates from AC mains power located within the control center and provides storage and an input/output interface for the processed measurements. Typically, the receiver 32 is located in the central indoor control room of the drilling rig.

In the present receiver hub design, one or more remote antennas are connected to the receiver hub via a, for example, Controller Area Network (CAN). The remote antennas receive radio frequency transmissions of the digitized sensor data from the RF transmitters of sensor sub 2 or other sensors and can be remotely located externally for optimum radio frequency reception. The radio frequency sensor signals are received and then sent to the receiver 32 using the CAN connection or other suitable connection network.

The main input/output data connection for the receiver hub is preferably an ethernet connection. The ethernet connection allows multiple receiver hubs to be interconnected to form a local network. By setting one receiver hub as a server and further receiver hubs as clients, any number of receiver hubs can be connected to accommodate any number of sensor inputs. Ethernet also preferably connects directly to displays and laptop computers for logging drilling and pipe handling operations. The receiver hub can also include a wireless internet connection for additional data networking capability when ethernet cabling is not practical. Additional inputs and outputs of data stream from the sub can also be connected to the receiver hub.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A system for measuring drilling and completion operational parameters in a tubular handling system, said system comprising:
   a) a sensor sub connected below a top drive of the tubular handling system within a saver sub section of the tubular handling system;
   b) one or more sensors located within the sensor sub, for measuring, in the form of electrical signals, operational parameters selected from the group consisting of pressure, torque, tension, acceleration in all three axis (X, Y, Z), rotations per minute (rpm) rotational turns, and temperature;
   c) one or more integrated circuits located within the sensor sub, for receiving electrical signals from the sensors and digitizing said signals;
   d) two or more radio frequency (RF) transmitters located in the sensor sub, for transmitting the digitized signals;
   e) one or more commercially available lithium batteries within the sensor sub for powering said one or more sensors and said one or more integrated circuits; and
   f) a remote receiver hub located remote from the tubular handling system and powerable from an AC power source, said remote receiver hub comprising:
      i) a remote antenna for receiving the digitized signals from the two or more RF transmitters;
      ii) one or more processing units for processing received digitized signals into engineering units for each of the operational parameters; and
      iii) an input/output data connection for communicating operational parameters to an operator,
   wherein the one or more processing units further perform correction of the digitized signals for temperature, gain, drift and cross-talk interactions between signals.

2. The system of claim 1, wherein the two or more RF transmitters comprise three RF transmitters each facing a different direction to provide spatial diversity and redundancy to transmission of the digitized signals.

3. The sensor sub of claim 1, comprising a battery holder for housing batteries in a hazardous environment, wherein said batteries are replaceable within the battery holder the battery holder stays in the hazardous environment.

4. The sensor sub of claim 3, wherein the battery holder comprises a removable end cap, and spring formed in a battery housing of the battery holder to urge the battery partially out of the battery housing when the end cap is opened, said spring and end cap serving to prevent electrical connection of the battery to battery holder until a predetermined number of threads of the battery cap have been engaged, thus sealing off a flame path and isolating the battery from the hazardous environment before electrical contact is made.

5. The sensor sub of claim 4, wherein the battery holder comprises one or more serrated contacts formed on the removable end cap to grip the battery electrical terminal.

6. The sensor sub of claim 5, wherein the end cap comprises a bearing to allow the cap to be screwed into the battery holder without rotating the serrated contact against the battery terminal.

* * * * *